United States Patent
Knauer et al.

(10) Patent No.: US 6,903,168 B2
(45) Date of Patent: Jun. 7, 2005

(54) GAS-PHASE FLUIDIZED-BED REACTOR

(75) Inventors: Benno Knauer, Ludwigshafen (DE); Peter Hennenberger, Freinsheim (DE); Klaus Hilligardt, Limburgerhof (DE); Eckard Schauss, Heuchelheim (DE); Horst Bullack, Wesseling (DE)

(73) Assignee: Basell Polyolefine, Wessling (DE)

( * ) Notice: Subject to any disclaimer, the term of this patent is extended or adjusted under 35 U.S.C. 154(b) by 96 days.

(21) Appl. No.: 10/696,428

(22) Filed: Oct. 30, 2003

(65) Prior Publication Data

US 2004/0087744 A1 May 6, 2004

Related U.S. Application Data

(62) Division of application No. 09/327,963, filed on Jun. 8, 1999, now Pat. No. 6,699,438.

(30) Foreign Application Priority Data

Jun. 9, 1998 (DE) .......................................... 198 25 589

(51) Int. Cl.$^7$ ................................................. C08F 2/34
(52) U.S. Cl. .................... 526/68; 526/901; 422/139; 422/143; 422/146

(58) Field of Search ............................ 526/88, 901, 68, 526/348.2, 348.4, 348.6; 422/139, 143, 146, 141

(56) References Cited

U.S. PATENT DOCUMENTS 3,829,983 A      8/1974    White ........................... 34/57
5,753,191 A   *   5/1998    Yamamoto et al. ......... 422/143

FOREIGN PATENT DOCUMENTS

EP               825204            2/1998

* cited by examiner

*Primary Examiner*—William K. Cheung
(74) *Attorney, Agent, or Firm*—Keil & Weinkauf

(57) ABSTRACT

Ethylenically unsaturated monomers are polymerized in a gas-phase fluidized-bed reactor comprising a reactor space (1) in the form of a vertical tube, a calming zone (2) adjoining the upper part of the reactor space, a circulated gas line (3), a circulated gas compressor (4), a cooling apparatus (5), a gas distributor plate (6) which forms the lower boundary of the reactor space and, if desired, a flow divider (7), wherein the gas distributor plate (6) has a plurality of gas flow orifices (8) whose outlet sides are widened conically.

12 Claims, 1 Drawing Sheet

GAS-PHASE FLUIDIZED-BED REACTOR

Figure 1:
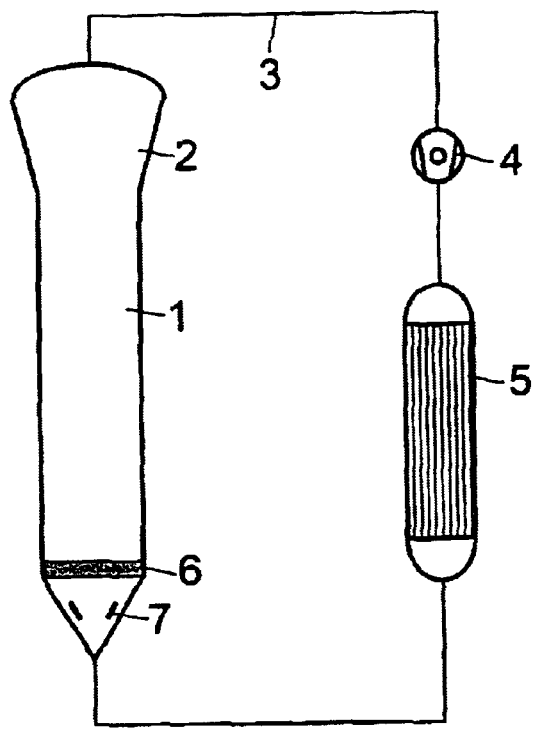

This is a divisional of U.S. Ser. No. 09/327,963, filed Jun. 8, 1999, now U.S. Pat. No. 6,699,438.

The present invention relates to a gas-phase fluidized-bed reactor for polymerizing ethylenically unsaturated monomers, comprising a reactor space (1) in the form of a vertical tube, a calming zone (2) adjoining the upper part of the reactor space, a circulated gas line (3), a circulated gas compressor (4), a cooling apparatus (5), a gas distributor plate (6) which forms the lower boundary of the reactor space and, if desired, a flow divider (7), wherein the gas distributor plate (6) has a plurality of gas flow orifices (8) whose outlet sides are widened conically.

The present invention also provides a process for polymerizing ethylene or copolymerizing ethylene with $C_3$–$C_8$–α–olefins in such a reactor.

Gas-phase polymerization processes are today among the preferred processes for polymerizing ethylenically unsaturated monomers, in particular for the polymerization of ethylene, if desired in the presence of further unsaturated monomers. Polymerization processes in fluidized beds are moreover particularly economical.

Gas-phase fluidized-bed reactors for carrying out such processes have been known for a long time. The reactors which are customary today have many common structural features: they comprise, inter alia, a reactor space in the form of a vertical tube whose diameter increases in the upper part. In this calming zone, there is a lower gas flow as a result of the larger tube diameter and this limits the fluidized bed comprising small polymer particles. In addition, these reactors have a circulated gas line in which there are installed cooling units for removing the heat of polymerization, a compressor and, if desired, further elements such as a cyclone for removing fine polymer dust. Examples of such gas-phase fluidized-bed reactors are described, for example, in EP-A-0 202 076, EP-A-0 549 252 and EP-A-0 697 421.

These known gas-phase fluidized-bed reactors use gas distributor constructions configured as perforated plates, sometimes in combination with an upstream flow divider, to distribute the gas uniformly across the entire reactor cross section. All these constructions result, between the gas outlet orifices or drilled holes, in more or less extensive, depending on hole spacing, horizontal, planar surfaces on the upper side of the reactor bottom against which the gaseous reaction medium flows only to a limited extent. To avoid deposits of product on these surfaces, it is possible, as described in EP-A-0 173 261, to arrange roof-shaped deflector plates above the bottom plate in such a way that the reaction medium passes over the faces of the deflector plates and the surface of the bottom. An exclusively vertical flow of the reaction medium directly into the powder bed is thus not present with this arrangement.

However, the vertical blowing-out of the surface of the bottom appears to be important when restarting the fluidized bed, e.g. after a shutdown; in addition, roof-shaped deflector plates lead to a higher pressure drop than is necessary for producing a uniform fluidized bed and are therefore associated with unnecessary power input and energy consumption.

Likewise horizontal swirling of the reaction medium on the surface of the bottom is described in EP-A-0 512 147. This is achieved by gas flow orifices running at an angle to the surface of the gas distributor, but these are technically very complicated to manufacture and therefore have to be let into the bottom plate as individual pieces. The conspicuous length of the gas channels also makes it easier for the gas distributor plate to become blocked and makes it more difficult to clean.

In documents such as EP-A-549 252, EP-A-297 794 and EP-A-509 618, attempts are made to keep the polymer powder flowing at the surface of the bottom by means of gas distributor plates which are folded or angled inward. Blowing-off or -out of the surface of the bottom to avoid product deposits is restricted in these constructions.

It is an object of the present invention to provide a gas-phase fluidized-bed reactor whose gas distributor plate is constructed such that the indicated disadvantages can be avoided and deposit formation at the upper side of the reactor bottom can be reduced in a simple way.

We have found that this object is achieved by the gas-phase fluidized-bed reactor described at the outset.

We have also found a polymerization process which is carried out in the gas-phase fluidized-bed reactor of the present invention.

The gas-phase fluidized-bed reactor depicted in FIG. 1 is only one of numerous possible schematic arrangements. Thus, for example, the sequence of the equipment items in the circulated gas line, particularly of the cooler and compressor, can also be reversed or further equipment items can be integrated into the line. Further elements such as systems for discharging the product and for metering-in the catalyst are not shown in FIG. 1; such elements are known to those skilled in the art and can be integrated into the reactor in a known manner.

An essential feature of the gas-phase fluidized-bed reactor of the present invention is the geometry of the bottom of the reactor and, in particular, the shape of the gas flow orifices. The conically widened structure of these orifices effectively reduces the formation of polymer deposits on the upper side of the bottom without using horizontally directed flows, and at the same time makes possible a uniform, vertical introduction of the reactor gas into the fluidized bed.

Figure 2:
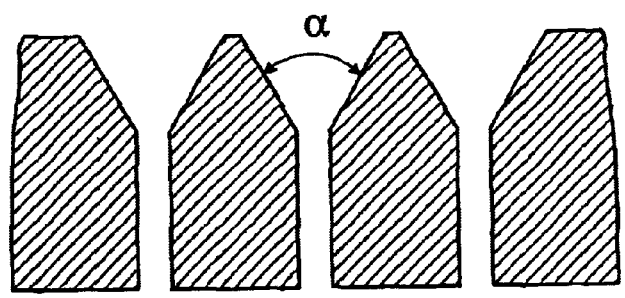

It has been found that the angle α of the conical widenings has a decisive influence on the deposit formation. In an advantageous embodiment of the gas-phase fluidized-bed reactor, the conical widenings of the gas flow orifices have an angle α of from 20 to 40°. Angles α of more than 40° should be avoided because they achieve insufficient reduction of the deposit formation, while angles α of less than 20° lead to a non-optimum bottom plate thickness if, as is advantageous, the edges of the orifices abut at the upper side of the plate or at least leave a very small planar surface. Angles α, of from 25 to 35° are particularly advantageous. A section through the conical orifices is shown in FIG. 2.

Figure 3:
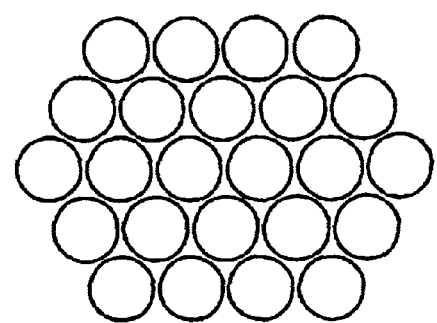

Another important parameter for reducing deposit formation is the planar proportion of the surface of the bottom. This is determined by the number of gas flow orifices, by the angle α and by the geometric distribution of the orifices over the plate. The remaining planar part of the upper side of the gas distributor plate should be as small as possible and is advantageously less than 20% of the total area of the gas distributor plate, preferably less than 10% and particularly preferably less than 5% of the total area. A particularly useful arrangement of the orifices in terms of minimizing the planar surface is an offset arrangement, i.e. alignment of the orifices with gaps in the adjacent row, as shown in FIG. 3.

The number and shape of the gas flow orifices is advantageously selected such that the pressure drop on flowing through the bottom plate is at least 30% of the pressure drop experienced by the gas mixture on flowing through the fluidized bed. In our experience, it is advisable to employ a value of about 50%, but a minimum pressure drop through the gas distributor of 50 mbar and a maximum pressure drop of 250 mbar, to avoid the danger of a jet mill or the formation of polymer dust.

To achieve an appropriate pressure drop and to distribute the gas mixture uniformly in the fluidized bed and also to prevent the polymer particles from trickling through when the compressor is switched off, it has been found to be useful to employ gas flow orifices which have a diameter of from 2 to 5 mm at their narrowest point.

Fears that the polymer powder could trickle through the conical holes to the underside of the bottom to an appreciable degree, e.g. when charging the reactor or when the fluidization process is interrupted, were unfounded. The polymer powder is held on the upper side of the bottom by bridge formation in the cones if the angle $\alpha$ is not too shallow (<40°).

In a preferred embodiment of the gas-phase fluidized-bed reactor of the present invention, a flow divider (7) is fitted below the gas distributor plate.

Various flow-directing devices, as are known to those skilled in the art, are suitable as flow dividers. Thus, for example, inclined metal strips can be formed into circles or concentric octagons and these can be arranged in such a way that there is effectively overlap between the octagons placed within one another as truncated cones. The channels formed in this way always consist of the underside of one octagon and the upper side of the next octagon so that the reaction medium flows past all sides of the metal strips.

Apart from the advantages mentioned, for example the avoidance of product deposits on the metal surfaces of reactor bottom and flow divider, the arrangement according to the present invention displays, as a result of optimum gas distribution, an extremely low temperature gradient of less than 2° C. over a fluidized bed height of about 14 meters (measured from 0.5 m above the bottom plate) at a temperature difference of more than 40° C. between fluidized bed and the fluidizing gas entering below the bottom plate.

The gas-phase fluidized-bed reactor of the present invention is particularly suitable for carrying out a process for polymerizing ethylene or copolymerizing ethylene with $C_3$–$C_8$–$\alpha$–olefins at from 30 to 125° C. and a pressure of from 10 to 90 bar.

The gas-phase fluidized-bed reactor of the present invention is in principle suitable for the polymerization of various ethylenically unsaturated monomers. Examples which may be mentioned are ethylene, propylene, 1-butene, isobutene, 1-pentene, 1-hexene, 1-heptene, 1-octene and also higher $\alpha$-olefins; furthermore, for example, dienes such as butadiene and cyclopentadiene and cycloolefins such as cyclopentene and cyclohexene are also possibilities. The ethylenically unsaturated monomers can be polymerized alone or in admixture.

The circulated reactor gas is fed in at the lower end of the gas-phase fluidized-bed reactor and is taken off again at its upper end. The circulated reactor gas is usually a mixture of ethylene, a molecular weight regulator such as hydrogen and inert gases such as nitrogen and/or saturated hydrocarbons such as ethane, butane or hexane. In addition, the reactor gas can comprise the above-mentioned $C_3$–$C_8$–$\alpha$–monoolefins.

The velocity of the reactor gas, measured as empty tube velocity, has to be sufficiently high not only to fluidize the mixed bed of small polymer particles which is located in the tube and serves as polymerization zone but also to effectively remove the heat of polymerization.

To set constant reaction conditions, the constituents of the reactor gas can be fed into the gas-phase fluidized-bed reactor either directly or via the circulated reactor gas. In general, it is found to be advantageous to introduce the above-mentioned $C_3$–$C_8$–$\alpha$–monoolefins directly into the gas-phase fluidized-bed reactor. Furthermore, it is advantageous in the process of the present invention to introduce the catalyst and any cocatalysts used directly into the mixed bed of small polymer particles. Here, it is found to be particularly advantageous to atomize the catalyst a little at a time by means of nitrogen or argon directly into the polymer bed using the method described in DE-A-35 44 915. The cocatalysts can then be sprayed into the bed using ethylene.

In order to avoid carry-over of small polymer particles from the polymerization zone into the circulated gas system, the gas-phase fluidized-bed reactor used for the process of the present invention has at its upper end a calming zone having an increased diameter which reduces the velocity of the circulated gas. In general, it is advisable to reduce the velocity of the circulated gas in this calming zone to from one third to one sixth of the velocity of the circulated gas in the polymerization zone.

After leaving the gas-phase fluidized-bed reactor, the circulated reactor gas is conveyed to a circulated gas compressor and a circulated gas cooler. The cooled and compressed circulated gas is then conveyed via the gas distribution devices described back into the mixed bed of the gas-phase fluidized-bed reactor.

In the process of the present invention too, the ratios of the starting materials, in particular the ratio of ethylene to $C_3$–$C_8$–$\alpha$–monoolefins, determine the density d of the resulting copolymers.

Furthermore, the amount of catalyst metered in determines the product output of the gas-phase fluidized-bed reactor.

The pressure of the reactor gas or the pressure at which the (co)polymerization is carried out is preferably from 10 to 80 bar and in particular from 20 to 40 bar.

The reactor of the present invention is particularly advantageous for carrying out the polymerization in the presence of condensed monomers and/or condensed inert hydrocarbons such as hexane, since deposit formation resulting from condensate droplets on the surface of the bottom is prevented by the devices according to the present invention.

The (co)polymer formed in the process of the present invention can be discharged from the gas-phase fluidized-bed reactor in a customary and known manner. Owing to the particular advantages of the process of the present invention and of the products prepared thereby, the product can be discharged to a let-down vessel simply by opening a ball valve in a discharge line. Here, the pressure in the let-down vessel is kept as low as possible in order to be able to use relatively long transport distances and to free the (co)polymers of adsorbed liquids such as residual monomers even during discharge. The (co)polymers can then be further purified in the let-down vessel, for example by flushing with small amounts of nitrogen. The residual monomers which are desorbed here, the flushing nitrogen and the propelling gas entrained in the discharge of product can be passed to a customary and known condensation step where they are separated from one another again, advantageously at atmospheric pressure and relatively low temperatures. In general, the liquid residual monomers are returned directly to the fluidized bed. The remaining gas mixture can be compressed in a customary and known return gas compressor and then added back to the circulated reactor gas.

The (co)polymers in the let-down vessel can be conveyed on to a deodorization or deactivation vessel where they can be subjected to a customary and known treatment with nitrogen and/or steam.

The gas distributor plate of the present invention, if desired in combination with a flow divider, ensures an extremely homogeneous gas distribution and optimum mixing of the polymer bed. The (co)polymers obtained according to the present invention can therefore be obtained free of agglomerates and make possible technically simpler product discharge than is the case in the known gas-phase fluidized-bed processes: complicated discharge locks are no longer necessary and the (co)polymers can be discharged simply by opening and closing a ball valve having a low cross section directly into a discharge or let-down vessel against low atmospheric overpressure without producing as ballast a high proportion of gas which would subsequently have to be separated off, compressed with consumption of a large amount of energy and returned to the gas-phase fluidized-bed reactor.

EXAMPLE

A fluidized-bed reactor having a diameter of 3.5 m and a height of 14 m was fitted with a bottom plate having the following dimensions:

| | |
|---|---|
| Thickness: | 50 mm |
| Number of holes: | 19,500 |
| Lower hole diameter: | 4 mm |
| Upper hole diameter: | 25 mm |
| Orifice angle α | 30° |

A continuous copolymerization of ethylene and hexene was carried out in this fluidized-bed reactor; the reaction gas had the following composition:

| | |
|---|---|
| Ethylene | 44.5 mol % |
| 1-hexene | 4.5 mol % |
| Hydrogen | 6.0 mol % |
| Nitrogen | 45.0 mol % |

The reactor pressure was 20 bar, the polymerization temperature was 100° C., the gas velocity was 0.7 m/sec. A pressure drop of 130 mbar was measured at the reactor bottom and a pressure drop of 250 mbar was measured in the fluidized bed.

The copolymerization was carried out continuously for 7 days. Subsequent inspection of the reactor found no deposits on the upper side of the bottom.

We claim:

1. A process for polymerizing ethylenically unsaturated monomers in the gaseous phase, the process is carried out in a gas-phase fluidized-bed reactor comprising a reactor space (1) in the form of a vertical tube, a calming zone (2) adjoining the upper part of the reactor space, a circulated gas line (3), a circulated gas compressor (4), a cooling apparatus (5), a gas distributor plate (6) which forms the lower boundary of the reactor space and, optionally, a flow divider (7), wherein the gas distributor plate (6) has a plurality of gas flow orifices (8) whose outlet sides are widened conically, said outlet sides being wider than the inlet sides.

2. The process of claim 1, wherein the polymerization is carried out in the presence of condensed monomers.

3. The process of claim 1 wherein ethylene is homopolymerized or copolymerized with C3–C8–a–olefins at from 30 to 125°C. and a pressure of 10 to 90 bars.

4. The process of claim 3 wherein ethylene is copolymerized with hexene-1.

5. The process of claim 1 wherein the conical widening of the gas flow orifices has an angle a of from 20 to 40°.

6. The process of claim 1 wherein the planar part of the upper side of the gas distributor plate apart from said orifices is less than 10% of the total area of the gas distributor plate.

7. The process of claim 1 wherein the gas flow orifices of the gas distributor plate are configured such that the pressure drop on flowing through the gas distributor plate is at least 30% of the pressure drop experienced by the gas mixture on flowing through the fluidized bed.

8. The process of claim 1 wherein the diameter of the gas flow orifices is from 2 to 5 mm at their narrowest point.

9. The process of claim 1 which includes said optional flow divider (7).

10. The process of claim 8, wherein the planar part of the upper side of the gas distributor plate apart from said orifices is less than 10% of the total area of the gas distributor plate.

11. The process of claim 10, wherein the gas flow orifices of the gas distributor plate are configured such that the pressure drop on flowing through the gas distributor plate is at least 30% of the pressure drop experienced by the gas mixture on flowing through the fluidized bed.

12. The process of claim 11, which includes said optional flow divider (7).

* * * * *

UNITED STATES PATENT AND TRADEMARK OFFICE
CERTIFICATE OF CORRECTION

PATENT NO.       : 6,903,168 B2
APPLICATION NO.  : 10/696428
DATED            : June 7, 2005
INVENTOR(S)      : Knauer et al.

It is certified that error appears in the above-identified patent and that said Letters Patent is hereby corrected as shown below:

Column 6,
Line 3 delete "monomers in the gaseous phase, the process is carried out in" and substitute -- monomers in the gaseous phase, wherein the process is carried out in --.
Line 17, delete "lymerized or copolymerized with C3-C8-a-olefins at from" and substitute -- lymerized or copolymerized with $C_3$-$C_8$-$\alpha$-olefins at from --.
Line 22, delete "the gas flow orifices has an angle a of from 20 to 40°" and substitiute -- the gas flow orifices has an angle $\alpha$ of from 20 to 40° --.

Signed and Sealed this

Twenty-seventh Day of June, 2006

JON W. DUDAS
*Director of the United States Patent and Trademark Office*